US009738122B2

(12) United States Patent
Nakatani et al.

(10) Patent No.: US 9,738,122 B2
(45) Date of Patent: Aug. 22, 2017

(54) TIRE PROVIDED WITH INFORMATION ACQUISITION DEVICE

(75) Inventors: Koji Nakatani, Hiratsuka (JP); Yoshihide Yamada, Hiratsuka (JP); Naobumi Michishita, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 370 days.

(21) Appl. No.: 13/819,768

(22) PCT Filed: Nov. 29, 2011

(86) PCT No.: PCT/JP2011/077568
§ 371 (c)(1),
(2), (4) Date: Feb. 28, 2013

(87) PCT Pub. No.: WO2012/073973
PCT Pub. Date: Jun. 7, 2012

(65) Prior Publication Data
US 2013/0167999 A1 Jul. 4, 2013

(30) Foreign Application Priority Data
Dec. 2, 2010 (JP) .................................. 2010-269313

(51) Int. Cl.
B60C 23/00 (2006.01)
B60C 23/04 (2006.01)
(Continued)

(52) U.S. Cl.
CPC .............. *B60C 23/04* (2013.01); *B60C 23/00* (2013.01); *B60C 23/0452* (2013.01);
(Continued)

(58) Field of Classification Search
CPC ... B60C 23/004; B60C 23/04; B60C 23/0444; B60C 23/0447; B60C 23/0455;
(Continued)

(56) References Cited

U.S. PATENT DOCUMENTS 6,257,289 B1    7/2001  Tomita et al.
6,418,994 B1 *  7/2002  Arnaud et al. ................. 152/556
(Continued)

FOREIGN PATENT DOCUMENTS

JP    7-132713 A      5/1995
JP    09136517 A  *  5/1997  ............. B60C 23/00
(Continued)

OTHER PUBLICATIONS

Machine Translation: JP09-136517 A; Shimura et al.*
(Continued)

*Primary Examiner* — Michael H Wilson
*Assistant Examiner* — Kendra Ly
(74) *Attorney, Agent, or Firm* — Global IP Counselors, LLP

(57) ABSTRACT

An information acquisition device is provided within a virtual plane including a coil axis of a coil-shaped antenna and having a perpendicular line orthogonal to an axis of rotation of a tire, such that the angle formed by the coil axis of the antenna relative to the tire rotational axis is within a range of 0° to 40°. The amount of attenuation of radio waves emitted from the antenna to the exterior of the tire is thereby reduced.

19 Claims, 15 Drawing Sheets

(51) Int. Cl.
*B60C 23/20* (2006.01)
*B60C 23/02* (2006.01)
*G06K 7/10* (2006.01)
*G06K 19/067* (2006.01)

(52) U.S. Cl.
CPC ...... *B60C 23/0498* (2013.01); *B60C 23/0433* (2013.01); *B60C 23/0444* (2013.01); *G06K 7/10* (2013.01); *G06K 19/0672* (2013.01); *Y10T 152/10495* (2015.01)

(58) Field of Classification Search
CPC ............ B60C 23/0433; B60C 23/0435; B60C 23/0442; B60C 23/0452; B60C 23/0486; B60C 23/0488; H01Q 1/2241
See application file for complete search history.

(56) References Cited

U.S. PATENT DOCUMENTS

| | | | |
|---|---|---|---|
| 7,619,509 B2* | 11/2009 | Tanaka | 340/442 |
| 2002/0190853 A1* | 12/2002 | Nigon et al. | 340/448 |
| 2003/0172729 A1 | 9/2003 | Benedict et al. | |
| 2004/0257213 A1 | 12/2004 | Tsujita | |
| 2006/0044118 A1* | 3/2006 | Katou | B60C 23/0408 340/425.5 |
| 2006/0081397 A1* | 4/2006 | Enchi | H05K 1/165 174/260 |
| 2007/0182533 A1 | 8/2007 | Tanaka | |
| 2008/0053582 A1 | 3/2008 | Shimura | |
| 2008/0122707 A1 | 5/2008 | Fagot-Revurat | |
| 2011/0062244 A1* | 3/2011 | Kato | G06K 19/07749 235/492 |
| 2011/0292630 A1* | 12/2011 | Yamaguchi | B60C 23/0493 361/807 |
| 2012/0154242 A1* | 6/2012 | Nakatani | B60C 23/0452 343/848 |
| 2012/0154252 A1* | 6/2012 | Nakatani | H01Q 7/00 343/895 |
| 2013/0189938 A1* | 7/2013 | Nakatani | H04B 1/0475 455/101 |
| 2013/0229275 A1* | 9/2013 | Nakatani | B60C 23/0452 340/447 |
| 2013/0231063 A1* | 9/2013 | Nakatani | G01D 3/10 455/70 |
| 2015/0122005 A1* | 5/2015 | Nakatani | H01Q 1/2241 73/146.5 |
| 2015/0140942 A1* | 5/2015 | Nakatani | H01Q 7/00 455/129 |

FOREIGN PATENT DOCUMENTS

| | | | |
|---|---|---|---|
| JP | 2001-525282 | 12/2001 | |
| JP | 2003-267006 A | 9/2003 | |
| JP | 2004-82775 A | 3/2004 | |
| JP | 2004-326158 A | 11/2004 | |
| JP | 2005-1498 A | 1/2005 | |
| JP | 2005-067585 A | 3/2005 | |
| JP | 2006-27390 A | 2/2006 | |
| JP | 2007-76506 A | 3/2007 | |
| JP | 2007107987 A * | 4/2007 | |
| JP | 3962073 B2 | 5/2007 | |
| JP | 2007-203960 A | 8/2007 | |
| JP | 2008-521698 A | 6/2008 | |
| JP | WO 2010067580 A1 * | 6/2010 | ........ B60C 23/0493 |
| JP | 2010-179888 A | 8/2010 | |
| JP | WO 2011027595 A1 * | 3/2011 | ........ B60C 23/0452 |
| WO | 2006/038585 A1 | 4/2006 | |
| WO | 2011/027595 A1 | 3/2011 | |

OTHER PUBLICATIONS

Machine Translation: JP 2007107987 A; Kato, Michiya.*
International Search Report of corresponding International Application No. PCT/JP2011/077568, dated on Mar. 6, 2012.

* cited by examiner

TIRE PROVIDED WITH INFORMATION ACQUISITION DEVICE

CROSS-REFERENCE TO RELATED APPLICATIONS

This U.S. National stage application claims priority under 35 U.S.C. §119(a) to Japanese Patent Application No. 2010-269313, filed in Japan on Dec. 2, 2010, the entire contents of Japanese Patent Application No. 2010-269313 are hereby incorporated herein by reference.

BACKGROUND

Field of the Invention

The present invention relates to a tire provided with an information acquisition device for transmitting information by radio waves using a coil-shaped antenna; more specifically, the present invention relates to a tire in which attenuation of transmitted radio waves from an information acquisition device is reduced.

Background Information

In vehicles, it has conventionally been very important to check and manage the air pressure in the tires, and cases where the tire air pressure reaches an abnormal value have very often been the cause of accidents happening. For this reason, there has been known a tire status monitoring system (for example, see Patent Literature 1) in which each wheel is provided with a tire information acquisition device for detecting the air pressure inside the tires of the wheels and transmitting information thereto, the system being provided with a monitoring device for acquiring the information relating to the tire air pressure transmitted from each of the tire information acquisition devices and for monitoring the air pressure in each of the tires and emitting an alarm whenever there is any abnormality in the air pressure.

The tire information acquisition devices in this tire status monitoring system are disposed in an interior space formed between the tire and the wheel. The tire information acquisition device has a case adapted to house, inter alia, an air pressure sensor including a pressure detection element for detecting the air pressure inside the tire, as well as a transmitter for converting the detection result from the air pressure sensor to an electric signal and transmitting same to the monitoring device wirelessly. The case is provided with a vent hole whereby the air inside the interior space formed between the tire and the wheel is to be introduced to the air pressure sensor of the interior. The monitoring device is disposed in the vicinity of the driver seat. The monitoring device receives the air pressure information relating to the tires as transmitted from the tire information acquisition devices, and generates a predetermined alarm for the drive in a case where the air pressure in a tire is lower than a predetermined reference pressure.

[Conventional Art Literature]
[Patent Literature]
[Patent Literature 1] Japanese Patent No. 3962073

SUMMARY

However, a case where the information acquisition device is provided, for example, to the interior space of a larger tire may result in the radio waves being blocked by a metal member (a steel carcass or the like) embedded into the tire in order to increase the strength of the tire, or may result in dramatic attenuation of the transmission radio waves emitted to the exterior of the tire.

It is an objective of the present invention to provide a tire provided with an information acquisition device in a tire interior space so as to reduce the attenuation of transmitted radio waves emitted to the exterior of the tire.

The present invention, in order to achieve the foregoing objective, proposes a tire provided with an information acquisition device, including: a sensor configured to detect predetermined physical information; a transmission circuit configured to transmit the physical information detected by the sensor; and a coil-shaped antenna connected to the transmission circuit and configured to emit a signal including the physical information as a radio wave of a predetermined frequency, wherein the information acquisition device is provided to an interior space of the tire such that an angle formed by a coil axis of the antenna relative to an axis of rotation of the tire is within a range of 0° to 40°.

In a case where a steel carcass is embedded inside a tire, as with, for example, a tire for a large-sized vehicle, a steel carcass embedded in a tire side surface is disposed so as to extend only in the tire radial direction. For this reason, in a case where the present invention is adapted for a tire for a large-sized vehicle, the gap bordered by an adjacent steel carcass can be used to increase the ability to emit the radio waves being emitted from the antenna outside of the tire. More specifically, disposing the antenna such that the direction of emitted electric field from the antenna is maximally orthogonal to the direction of the steel carcass extending in the tire radial direction lowers the blocking of the radio waves by the steel carcass and makes it possible to suppress the extent to which the transmitted radio waves emitted to the tire exterior are attenuated.

According to the present invention, the emission efficiency of radio waves being emitted from an antenna to the tire exterior can be improved, and the attenuation of the transmitted radio waves can be reduced.

DETAILED DESCRIPTION OF EMBODIMENTS

The following is a description of an embodiment of the present invention, with reference to the accompanying drawings.

Figure 1:
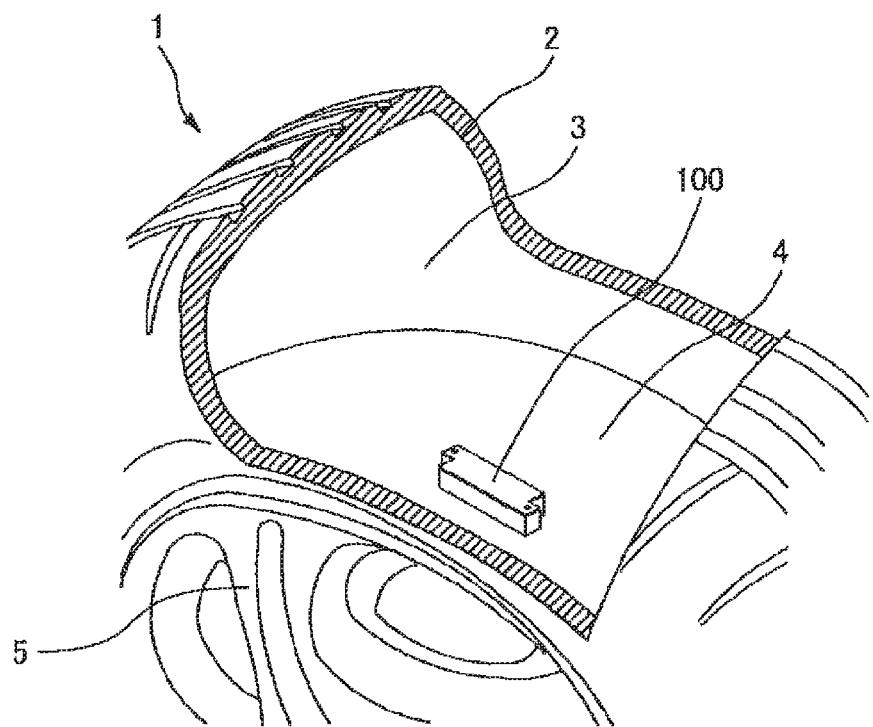
FIG. 1 is a view illustrating a tire loaded with a tire information acquisition device in an embodiment of the present invention.
Figure 2:
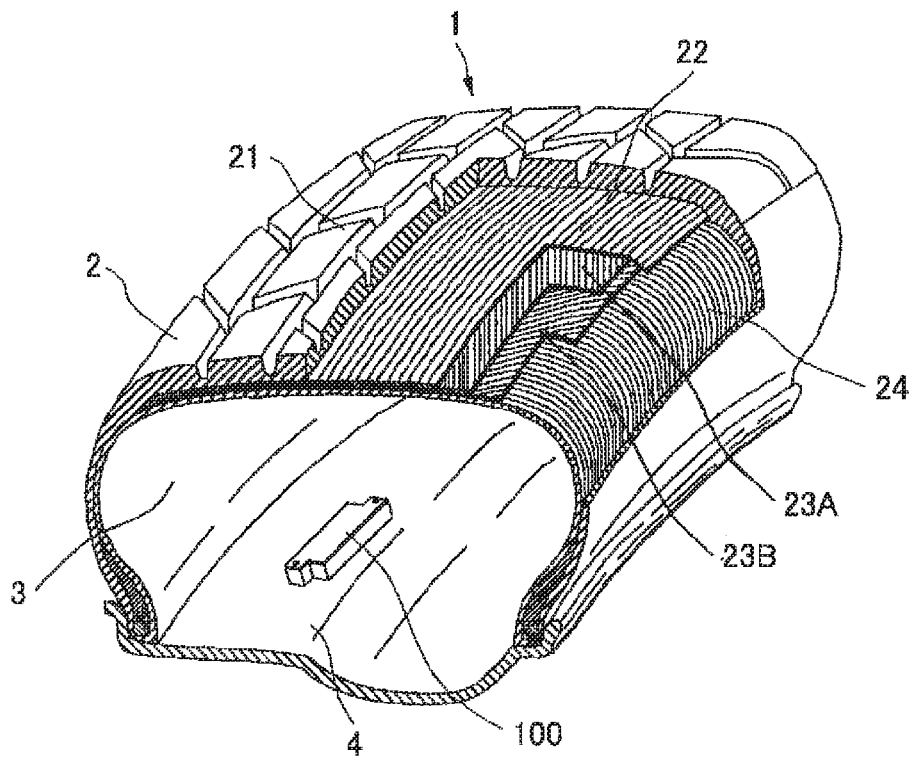
FIG. 2 is a view illustrating a tire structure in an embodiment of the present invention.

FIG. 1 is a view illustrating a tire loaded with an information acquisition device in an embodiment of the present invention, and FIG. 2 is a view illustrating a tire structure in an embodiment of the present invention.

As illustrated in FIG. 1, a wheel assembly 1 according to the present embodiment has a tire 2, a rim 4, a wheel 5, and an information acquisition device 100. The information acquisition device 100 is fixed to an outer peripheral surface of the rim 4, and the information acquisition device 100 is provided to the interior of an air chamber 3 of the tire 2. The information acquisition device 100 is provided with a sensor part having a pressure detection element and a temperature detection element, as shall be described below, and the sensor part detects the pressure and temperature inside the air chamber 3. The information acquisition device 100 converts the detection results relating to temperature and pressure to digital values, and generates and transmits digital information including these digital values. In addition to the digital values of the detection results relating to the temperature and pressure inside the air chamber 3, the digital information also includes identification information unique to the information acquisition device 100.

The tire 2 according to the present embodiment is ordinarily used in a large-sized truck, a bus, a construction vehicle, or a similar large-sized vehicle. The tire 2 is, for example, a known tubeless radial tire. As illustrated in FIG. 2, belts 23A, 23B made of steel (steel belts) and a carcass 24 made of steel (steel carcass) are embedded in the tire 2. The tire 2 is constituted of, inter alia, a known cap tread 21, an under-tread 22, the belts 23A, 23B, the carcass 24 and the like.

Figure 3:
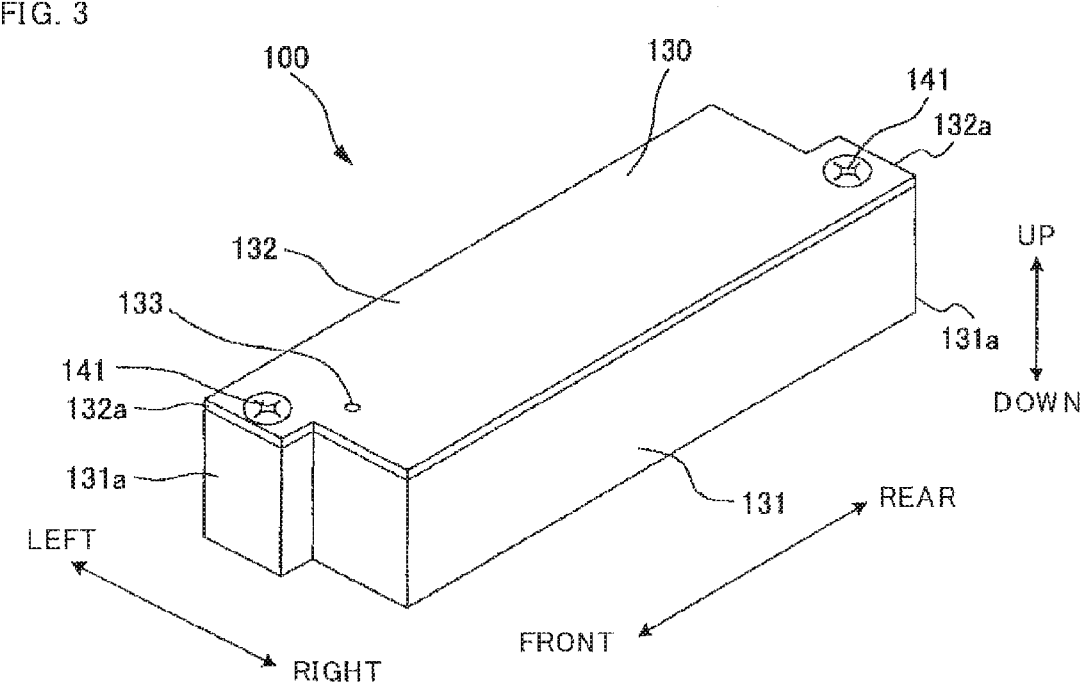
FIG. 3 is an exterior perspective view illustrating an information acquisition device in an embodiment of the present invention.
Figure 4:
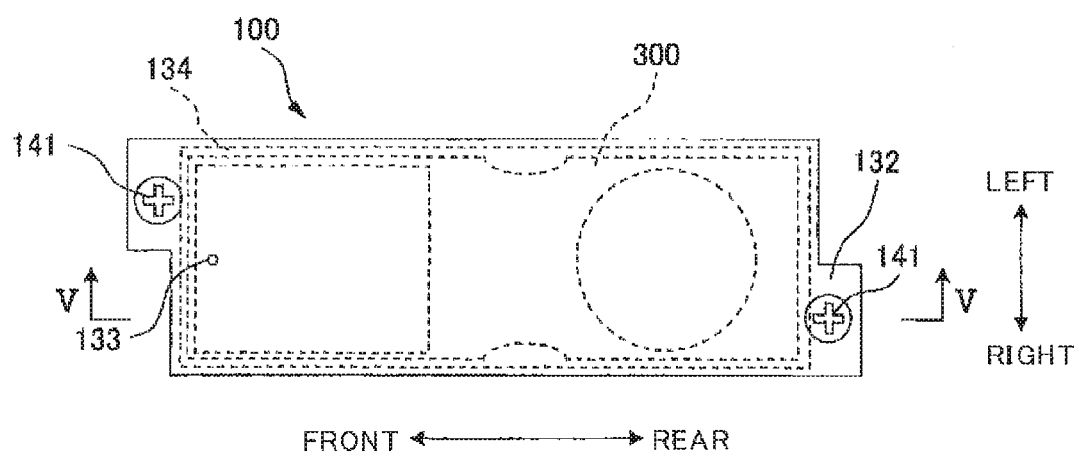
FIG. 4 is a plan view illustrating an information acquisition device in an embodiment of the present invention.
Figure 5:
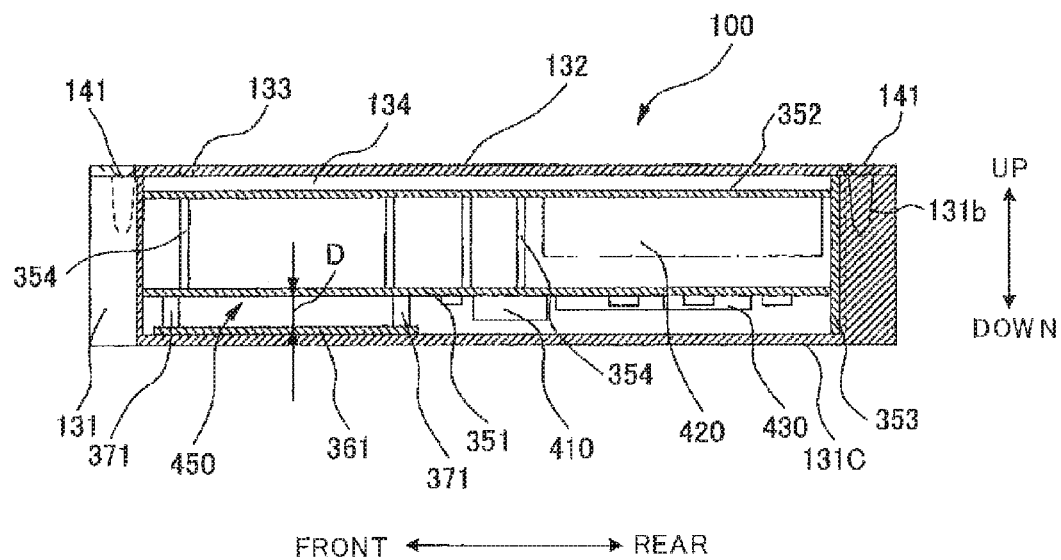
FIG. 5 is a side cross-sectional view illustrating an information acquisition device in an embodiment of the present invention.

FIG. 3 is an exterior perspective view of the information acquisition device 100, FIG. 4 is a plan view of the information acquisition device 100, and FIG. 5 is a side cross-sectional view (a cross-sectional view of line V-V in FIG. 4) of the information acquisition device 100. Hereinbelow, for the sake of simplicity of description, the length direction, width direction, and height direction of the information acquisition device 100, which are orthogonal to each other, have been defined as being the front-rear direction, the left-right direction, and the up-down direction, respectively, and the configuration of each of the parts shall be described in compliance with these definitions. The front-rear direction matches, for example, the direction of travel of the tire wheel assembly 1, and the left-right direction matches, for example, the direction of the axis of rotation of the wheel assembly 1.

As illustrated in FIG. 3, the information acquisition device 100 is provided at the outermost part thereof with a case 130 of substantially cuboid shape extending in the front-rear direction. "Of substantially cuboid shape" refers to a cuboid shape or a substantially cuboid shape, and includes those shapes which are essentially identical to a cuboid. As illustrated in FIGS. 3 and 4, the case 130 is constituted of a case main body 131, the upper surface of which is opened, and a lid body 132 mounted onto the upper surface of the case main body 131. The case main body 131 has a protruding part 131a for screwing at each of the two front and rear end parts, and, in correspondence therewith, the lid body 132 also has a protruding part 132a at each of the two front and rear end parts.

As illustrated in FIG. 5, an accommodating space 134 for accommodating a device main body 300 is formed in the interior of the case main body 131. A screw hole 131b is provided to the protruding parts 131a of the case main body 131, and screws 141 which are passed through the protruding part 132a of the lid body 132 are screwed into the screw holes 131b, whereby the lid body 132 is fixed to the upper surface of the case main body 131. The opening of the upper surface of the accommodating space 134 is thereby closed off. A mounting part for the information acquisition device 100 is formed on a base surface 131c of the case main body 131. The information acquisition device 100 is mounted onto the rim 4 with the mounting part of the base surface 131c being brought into contact against an outer peripheral surface of the rim 4. The information acquisition device 100 is mounted into the rim by an adhesive agent, mounting band, or the like, or is mounted to a tire valve of the rim 4.

As illustrated in FIG. 4, a vent hole 133 is opened on a front end part of the lid body 132 (farther to the rear than the protruding part 132a). Air is thereby allowed to pass through between the interior and exterior of the case 130 via the vent hole 133 in the state where the lid body 132 has been fixed to the case main body 131, and this allows for the temperature and pressure of the air inside the air chamber 3 to be detected.

Figure 6:
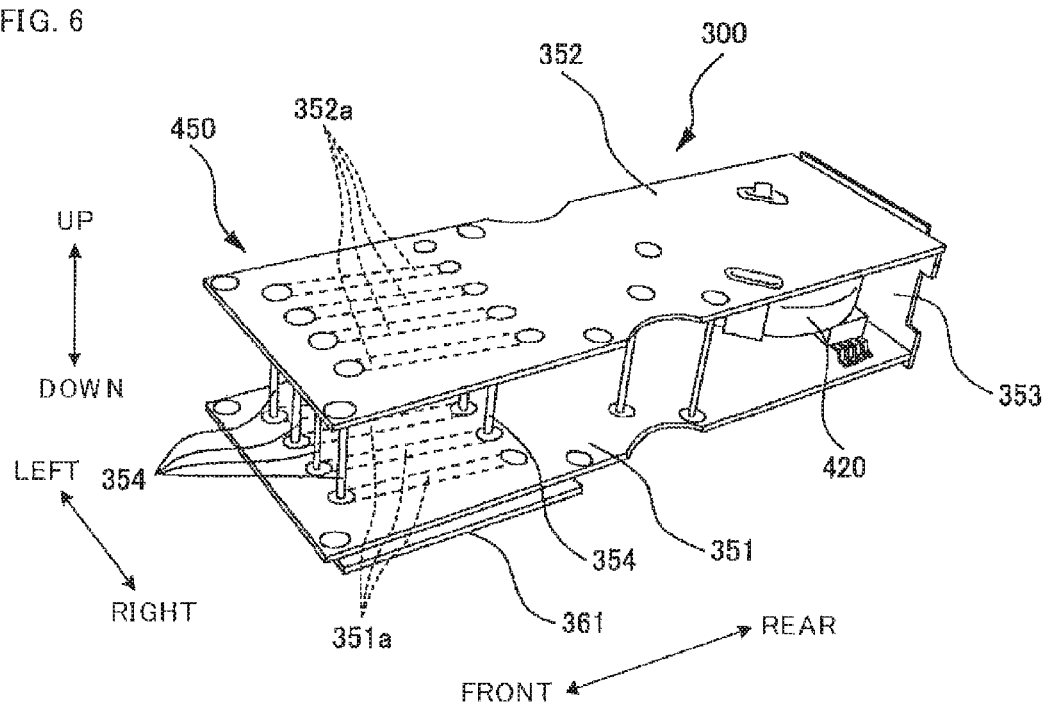
FIG. 6 is an exterior perspective view illustrating a device main body in an embodiment of the present invention.
Figure 7:
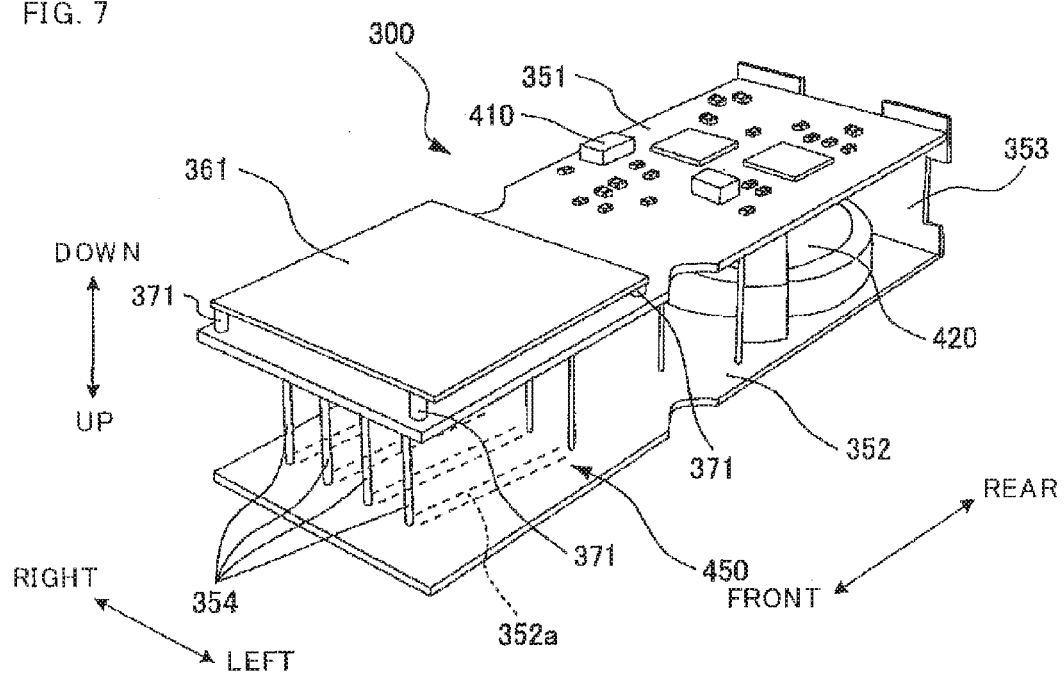
FIG. 7 is an exterior perspective view illustrating a device main body in an embodiment of the present invention.
Figure 8:
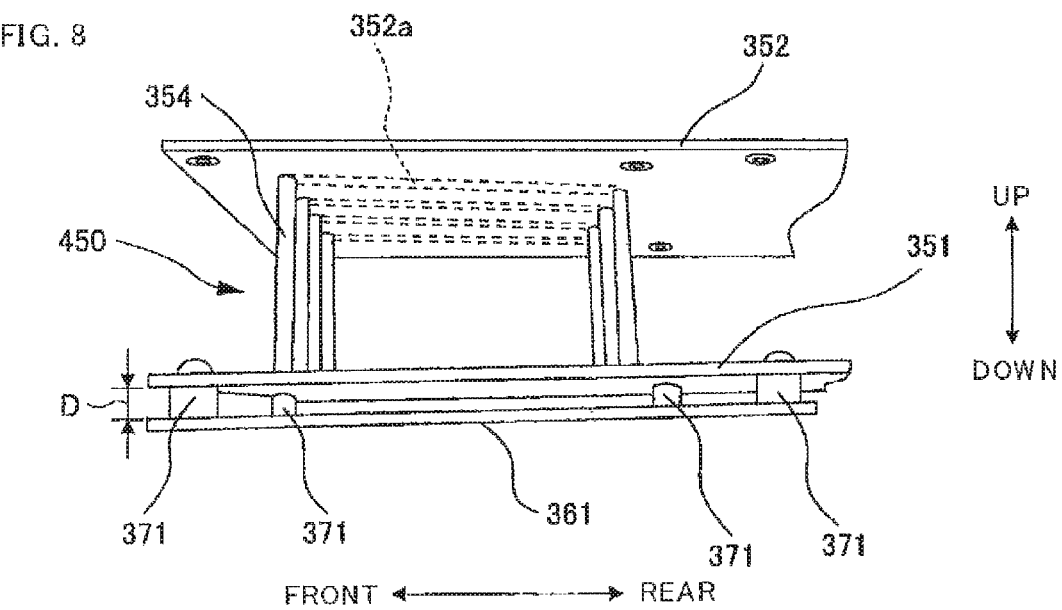
FIG. 8 is an exterior perspective view illustrating the main parts of a device main body in an embodiment of the present invention.

Each of FIGS. 6 and 7 is a exterior perspective view of the device main body 300 accommodated within the case 130, and FIG. 8 is an exterior perspective view illustrating the main parts (at the front-side portion) of the device main body 300. FIG. 6 is a drawing where the device main body 300 is viewed obliquely from above, and FIG. 7 is a drawing where the device main body is viewed obliquely from below.

As illustrated in FIGS. 6 to 8, the device main body 300 has: a first printed wiring board 351 of substantially rectangular shape corresponding to the shape of the accommodating space 134 in plan view; a second printed wiring board 352 of a substantially rectangular shape disposed above the first printed wiring board 351 and spaced apart from the first printed wiring board 351 by a predetermined interval so as to be substantially in parallel with the first printed wiring board 351; a third printed wiring board 353 which extends in the up-down direction at the rear end part of the device main body 300 and connects together the rear end part of the first printed wiring board 351 and the rear end part of the second printed wiring board 352; and a plurality of columnar connection conductors 354 which extend in the up-down direction at the front-side portion of the device main body 300 and connect together the first printed wiring board 351 and the second printed wiring board 352. "Substantially rectangular shaped" herein refers to a rectangular shape or a substantially rectangular shape, and includes those shapes which are essentially identical to a rectangle. "Substantially in parallel" refers to being in parallel or substantially in parallel, and includes being essentially in parallel. The third printed wiring board 353 and the connection conductors 354 are each connected to the first printed wiring board 351 and the second printed wiring board 352 by soldering.

Figure 9:
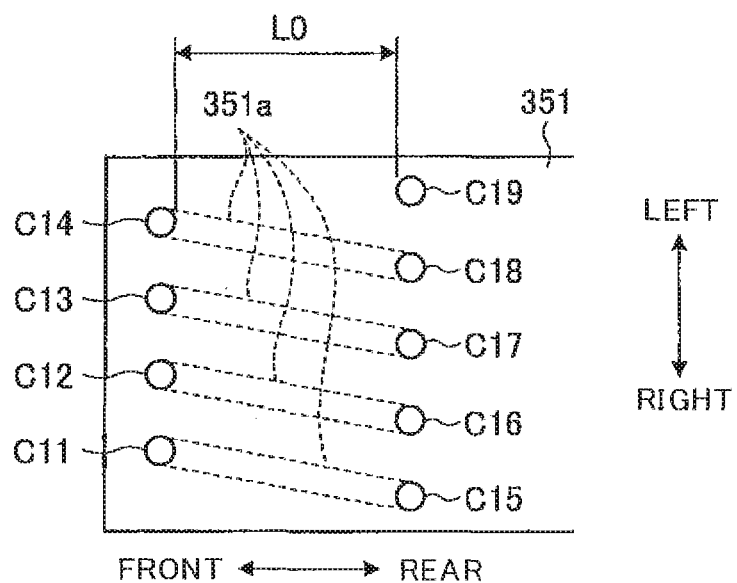
FIG. 9 is a plan view schematically illustrating a first printed wiring provided to a device main body in an embodiment of the present invention.
Figure 10:
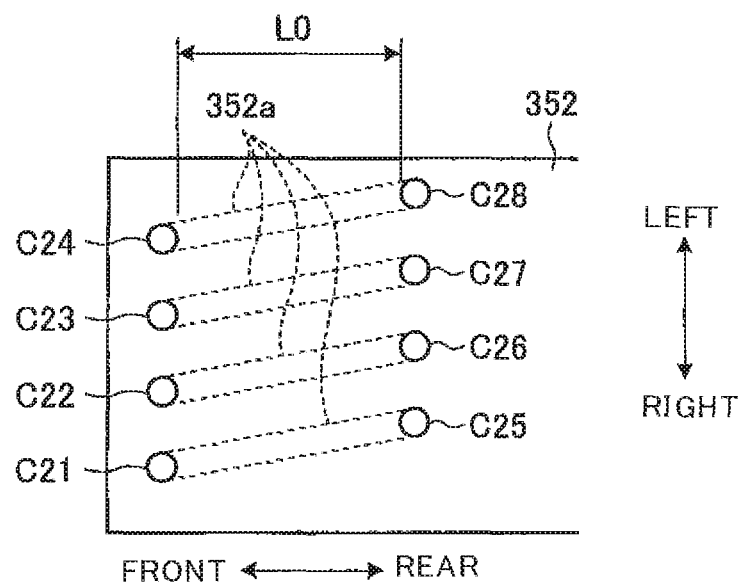
FIG. 10 is a plan view schematically illustrating a second printed wiring provided to a device main body in an embodiment of the present invention.
Figure 11:
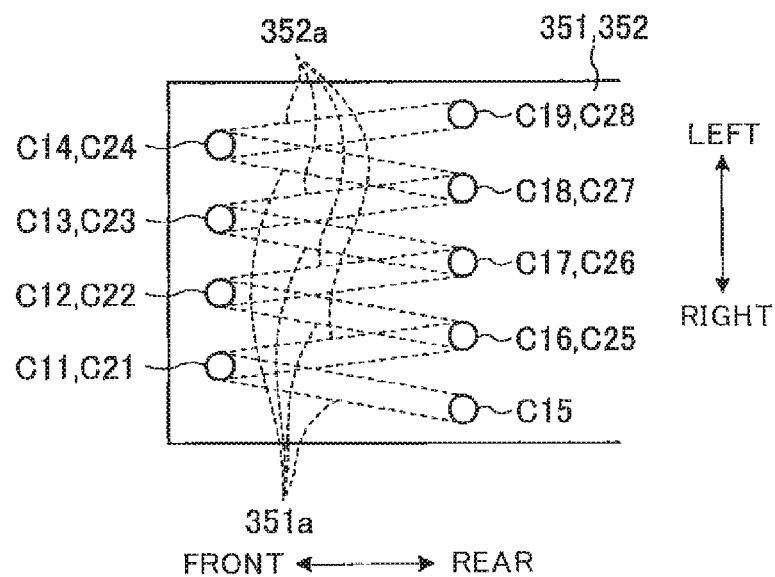
FIG. 11 is a drawing of a superimposed illustration of FIGS. 9 and 10 in an embodiment of the present invention.

A predetermined conductor pattern which includes a plurality of first printed wirings 351*a* extending in the front-rear direction is formed on the first printed wiring board 351. A predetermined conductor pattern which includes a plurality of second printed wirings 352*a* extending in the front-rear direction is formed on the second printed wiring board 352. FIG. 9 is a plan view schematically illustrating the first printed wirings 351*a*; FIG. 10 is a plan view schematically illustrating the second printed wirings 352*a*; and FIG. 11 is a plan view schematically illustrating the positional relationships between the first printed wirings 351*a* and the second printed wirings 352*a* (a drawing of a superimposed illustration of FIGS. 9 and 10). FIGS. 9 to 11 depict there being four each of the first printed wirings 351*a* and of the second printed wirings 352*a*, but the number of printed wirings 351*a*, 352*a* is not limited thereto.

As illustrated in FIG. 9, a plurality (herein, four) of connecting parts C11-C14 are provided at regular intervals in the left-right direction to the front end part of the first printed wiring board 351. Further, a plurality (herein, four) of connecting parts C15-C19 are provided at regular intervals in the left-right direction to the first printed wiring board 351, at positions spaced apart from the connecting parts C11-C14 by a predetermined distance L0. The first printed wirings 351*a* are provided extending from C11 to C15, from C12 to C16, from C13 to C17, and from C14 to C18. The first printed wirings 351*a* are thereby disposed in parallel with each other and at regular intervals in the left-right direction.

As illustrated in FIG. 10, a plurality (herein, four) of connecting parts C21-C24 are provided at regular intervals in the left-right direction to the front end part of the second printed wiring board 352. Further, a plurality (herein, four) of connecting parts C25-C28 are also provided at regular intervals in the left-right direction to the second printed wiring board 352, at positions spaced apart from the connecting parts C21-C24 by the predetermined distance L0. The second printed wirings 352*a* are provided extending from C21 to C25, from C22 to C26, from C23 to C27, and from C24 to C28. The second printed wirings 352*a* are thereby disposed in parallel with each other and at regular intervals in the left-right direction.

As illustrated in FIG. 11, the connecting parts C11-C14 of the first printed wiring board 351 and the connecting parts C21-C24 of the second printed wiring board 352 are provided at identical positions to each other in plan view. The connecting parts C16-C19 of the first printed wiring board 351 and the connecting parts C25-C28 of the second printed wiring board 352, too, are provided at identical positions to each other in plan view. The first printed wirings 351*a* and the second printed wirings 352*a* are connected together via the connecting parts C11-C19, C21-C28, and the entirety forms a zigzagging shape.

Figure 12:
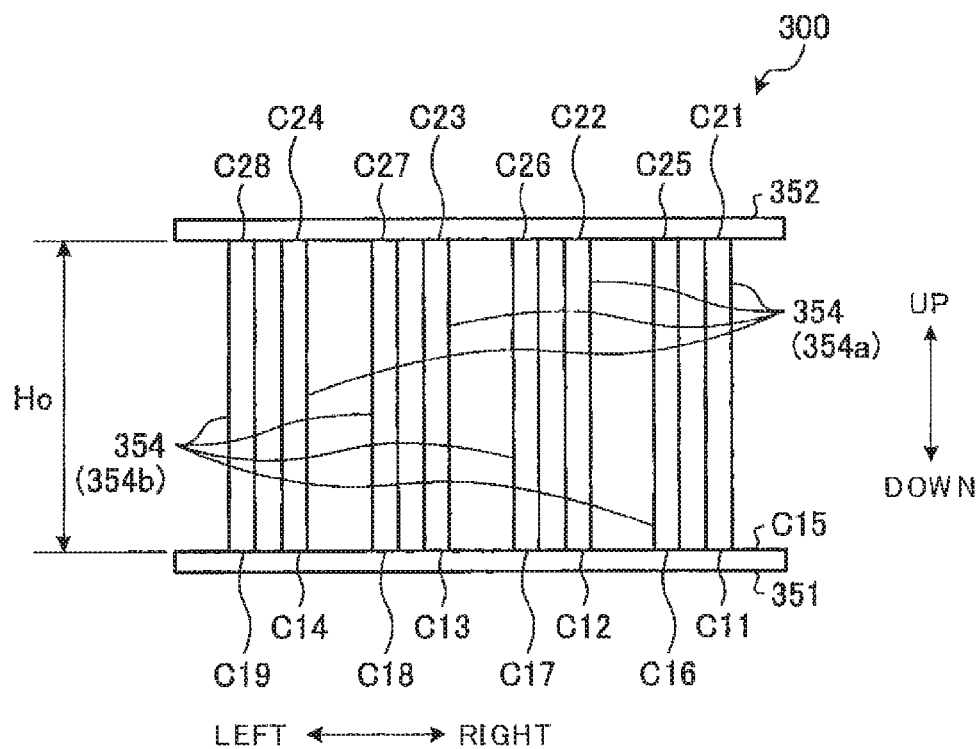
FIG. 12 is a view illustrating the arrangement of a columnar connection conductor provided to a device main body in an embodiment of the present invention.

As illustrated in FIGS. 6 to 8, the plurality of columnar connection conductors 354 are disposed separately to the front and rear so as to correspond to the positions of the connecting parts C11-C19, C21-C28. FIG. 12 is a drawing where the device main body 300 is viewed from the front, and principally illustrates the arrangement of the columnar connection conductors 354. In FIG. 12, the left-right positioning of the front-side connection conductors 354 (called first connection conductors 354*a*) and the left-right positioning of the rear-side connection conductors 354 (called second connection conductors 354*b*) have been shifted from each other, but the printed wirings 351*a*, 352*a* may also be formed such that the left-right positioning of the two are overlapped. The length of each of the connection conductors 354 is equal to the distance H0 between the first printed wiring board 351 and the second printed wiring board 352. There are four each of the first connection conductors 354*a* and the second connection conductors 354*b* provided; in total, there are eight of the connection conductors 354 provided. The number of the connection conductors 354 is determined in accordance with the number of first printed wirings 351*a* and the second printed wirings 352*a*, and is not limited to being eight.

As illustrated in FIG. 12, the upper end part and lower end part of each of the first connection conductors 354*a* are connected by soldering to the connecting parts C21-C24 of the second printed wiring board 352 and the connecting parts C11-C14 of the first printed wiring board 351, respectively. The upper end part and lower end part of each of the second connection conductors 354*b* are soldered to the connecting parts C25-C28 of the second printed wiring board 352 and the connecting parts C16-C19 of the first printed wiring board 351, respectively.

Thereby, as illustrated in FIGS. 6 to 8, the first printed wirings 351*a* and the second printed wirings 352*a* are connected together via the connection conductors 354, and a helically wound antenna 450 is formed by the first printed wirings 351*a*, the second printed wirings 352*a*, and the connection conductors 354. More specifically, the upper and lower end parts of each of the connection conductors 354 are connected to the first printed wirings 351*a* and the second printed wirings 352*a*, and an overall coil-shaped antenna 450 is formed. Herein, "coil-shaped" refers not only to the conductors being wound along a cylindrical surface, but also includes the conductors being wound along side surfaces of a cuboid, as in the present embodiment. More specifically, the helically shaped antenna 450, formed when the first printed wirings 351*a*, the first connection conductors 354*a*, the second printed wirings 351*b*, and the second connection conductors 354*b* are connected together in the stated order, may be formed according to a curve or a bent straight line.

The start point of the helix of the antenna 450 constituted of the first printed wirings 351*a*, the second printed wirings 352*a*, and the connection conductors 354 is the connecting part C15 at the right rear end side of the first printed wiring board 351, and the end point thereof is the connecting part C19 at the left rear end side of the first printed wiring board 351. These connecting parts C15, C19 are connected to a conductor pattern (power source circuit or the like) of the first printed wiring board 351, and a current flows to the antenna 450 via the connecting parts C15, C19. An axis passing through the center of the cuboid space enclosed by the first printed wirings 351a, the second printed wirings 352a, the first connection conductors 354a, and the second connection conductors 354b, i.e., a coil axis C passing through the center of the coil-shaped antenna 450, extends in the left-right direction (the width direction of the information acquisition device 100), as illustrated in FIG. 11.

As illustrated in FIGS. 6 to 8, the antenna 450 is formed at the front end part of the device main body 300; at the rear end side of the device main body 300, a sensor part 410 and an electrical cell 420 or similar electronic component is loaded. The sensor part 410 and the electrical cell 420 constitute an electrical circuit.

Figure 13:
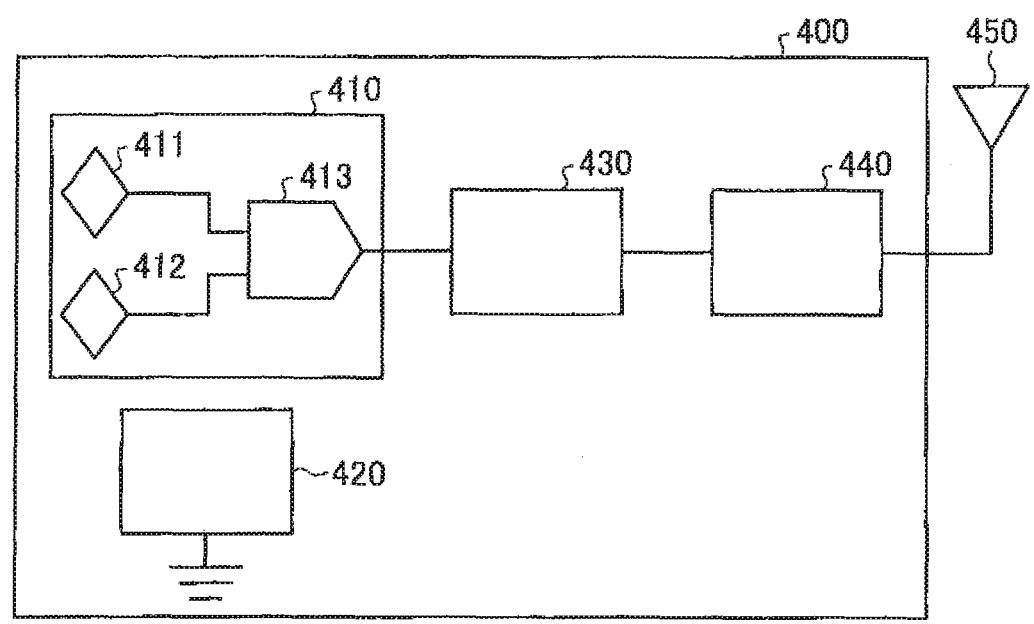
FIG. 13 is a block diagram illustrating the electrical circuitry of an information acquisition device in an embodiment of the present invention.

FIG. 13 is a block diagram illustrating the electrical circuitry of the information acquisition device 100. As illustrated in FIG. 13, the device main body 300 has a detection and transceiver circuit 400. The detection and transceiver circuit 400 is configured to comprise the sensor 410, the electrical cell 420, a main control unit 430, a transceiver unit 440, and the antenna 450.

As illustrated in FIG. 7, the sensor part 410 is loaded onto the surface of the device main body 300 (the lower surface of the first printed wiring board 351). As illustrated in FIG. 13, the sensor part 410 is constituted of an air pressure detection element 411, a temperature detection element 412, and an analog/digital conversion circuit 413. The sensor part 410 detects the air pressure and temperature inside, for example, an air chamber of a pneumatic fender, using the air pressure detection element 411 and the temperature detection element 412, converts the detection results therefrom to digital values using the analog/digital conversion circuit 413, and outputs same to the main control unit 430.

The electrical cell 420 is connected to the device main body 300 by a connection conductor (not shown), and supplies power to the detection and transceiver circuit 400 of the device main body 300.

The main control unit 430 is constituted of a known CPU and memory and the like. The main control unit 430 receives the detection results from the sensor unit 410, as digital values, and generates digital information including the digital values and outputs same to the transceiver unit 440. In addition to the digital values of the detection results, the digital information also includes pre-set identification information unique to the device main body 300 (which has been either pre-written into the memory or set by a dual in-line package (DIP) switch).

The transceiver unit 440 switches between transmitting and receiving, on the basis of a command from the main control unit 430. During transmission, the transceiver unit 440 uses radio waves of a predetermined frequency, e.g., 315 MHz, to transmit from the antenna 450 digital information inputted from the main control unit 430. During reception, the transceiver unit 440 detects the digital signal from the radio waves of the predetermined frequency (315 MHz) received via the antenna 450, and extracts the digital information from the detected digital signal and outputs same to the main control unit 430. The transmission frequency and the reception frequency of the transceiver unit 440 are both set to the same frequency.

The antenna 450 is a coil-shaped antenna having a resonant frequency set to the transceiver frequency of the transceiver unit 440. The antenna 450, as has been described above, is constituted of the first printed wirings 351a provided to the first printed wiring board 351, the second printed wirings 352a provided to the second printed wiring board 352, and the columnar connection conductors 354 for electroconductively connecting together the first printed wirings 351a and the second printed wirings 352a and fixing the printed wiring boards 351, 352 to each other.

As illustrated in FIG. 8, a rectangular, planar conductive plate 361 is fixed by four holding members 371 to the lower surface of the first printed wiring board 351. The planar conductive plate 361 is disposed below the antenna 450 so as to be in parallel with the first printed wiring board 351 located on the base surface side of the case main body 131 when the device main body 300 is accommodated within the case 130. A predetermined gap D is maintained between the planar conductive plate 361 and the first printed wiring board 351 by the holding members 371. The planar conductive plate 361 is electroconductively connected to a predetermined conductor pattern of the first printed wiring board 351 (to a conductor pattern connected to negative electrode of the electrical cell 420), and is set to a reference potential.

Figure 14:
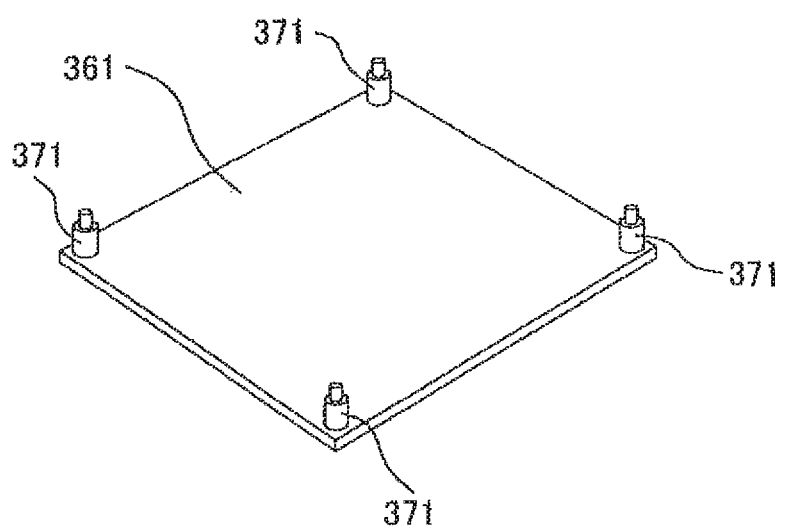
FIG. 14 is an exterior perspective view illustrating a planar conductive plate and a holding member in an embodiment of the present invention.
Figure 15:
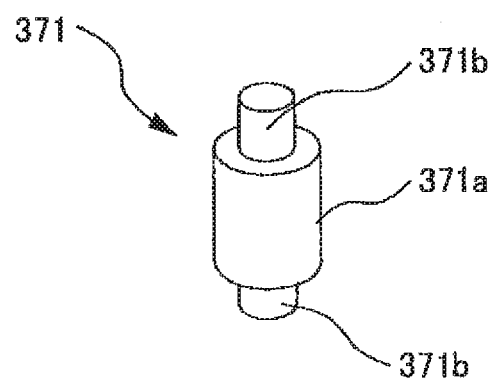
FIG. 15 is an exterior perspective view illustrating a holding member in an embodiment of the present invention.

FIG. 14 is a perspective view where the planar conductive plate 361 is viewed obliquely from above, and FIG. 15 is a perspective view of the holding members 371. As illustrated in FIG. 14, each of the holding members 371 is fixedly provided to each of the four corners of the upper surface of the planar conductive plate 361. As illustrated in FIG. 15, the holding members 371 have a columnar-shaped main body 371a, and a pair of columnar protruding parts 371b of a lesser diameter than that of the main body 371a, the protruding parts being provided protruding from both end surfaces of the main body 371a. One of the protruding parts 371b interlocks with a recess or through-hole provided to the four corners of the planar conductive plate 361, and the planar conductive plate 361 and the holding members 371 are thereby integrated. The other of the protruding parts 371b interlocks with a recess or through-hole provided to the first printed wiring board 351, and the planar conductive plate 361 is thereby fixed to the first printed wiring board 351 via the holding members 371.

In a state where the planar conductive plate 361 has been fixed to the first printed wiring board 351, the resonant frequency of the antenna 450 is, for example, 315 MHz. The antenna impedance at 315 MHz is 50Ω. The gap D (FIG. 8) between the first printed wiring board 351 and the planar conductive plate 361 at such a time is set to be, for example, 1.5 mm, using the holding members 371.

Figure 16:
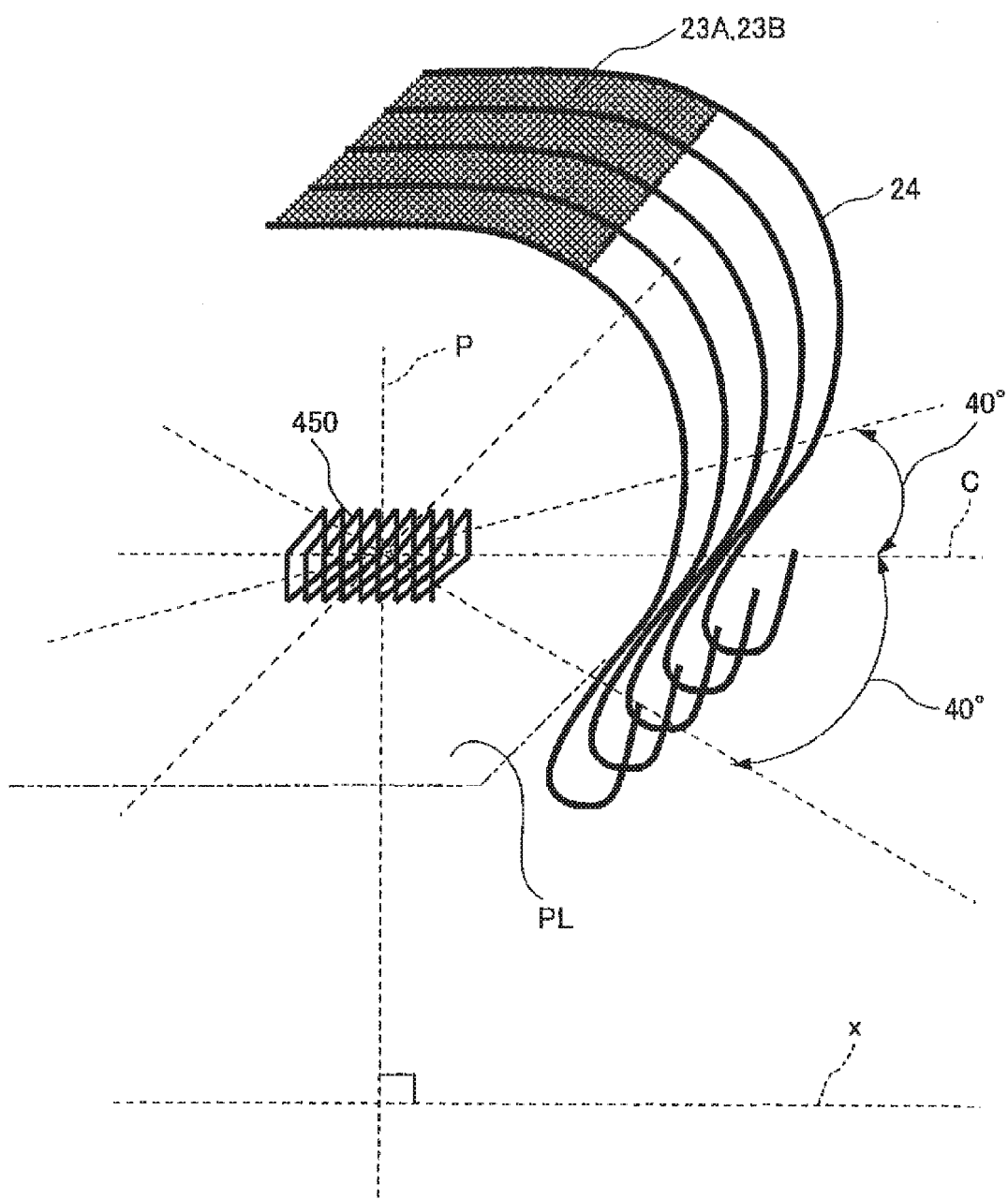
FIG. 16 is a perspective view illustrating the arrangement of an antenna with respect to a tire rotational axis in an embodiment of the present invention.
Figure 17:
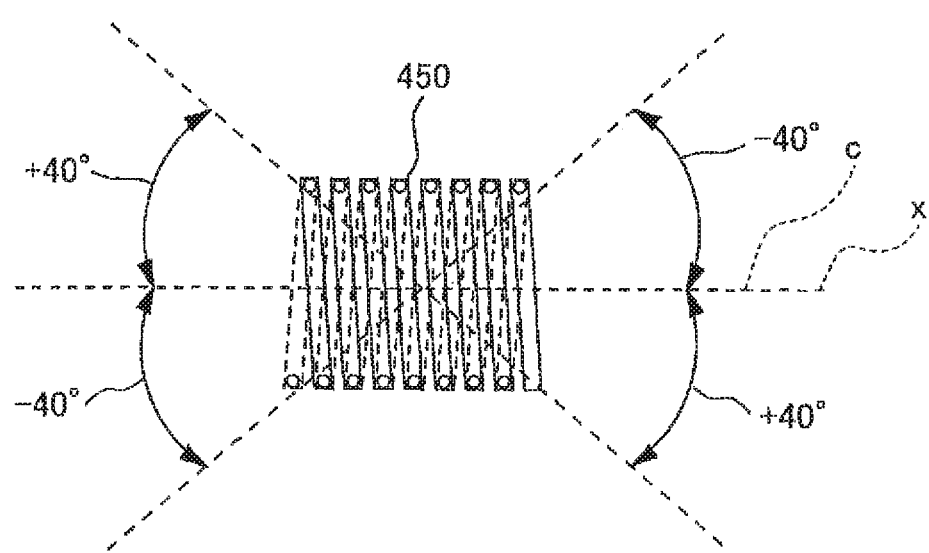
FIG. 17 is a plan view illustrating the arrangement of an antenna with respect to a tire rotational axis in an embodiment of the present invention.
Figure 18:
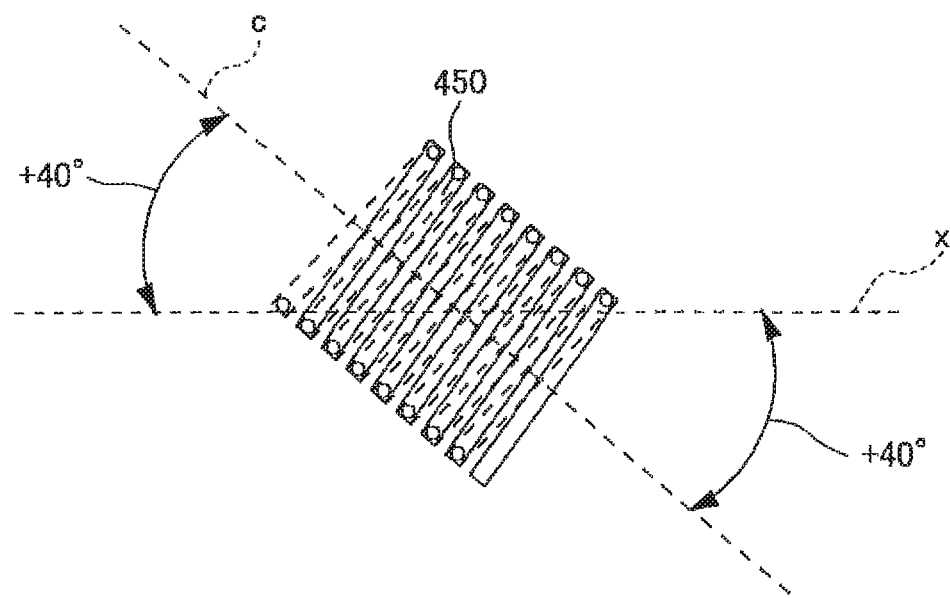
FIG. 18 is a plan view illustrating the arrangement of an antenna with respect to a tire rotational axis in an embodiment of the present invention.
Figure 18:
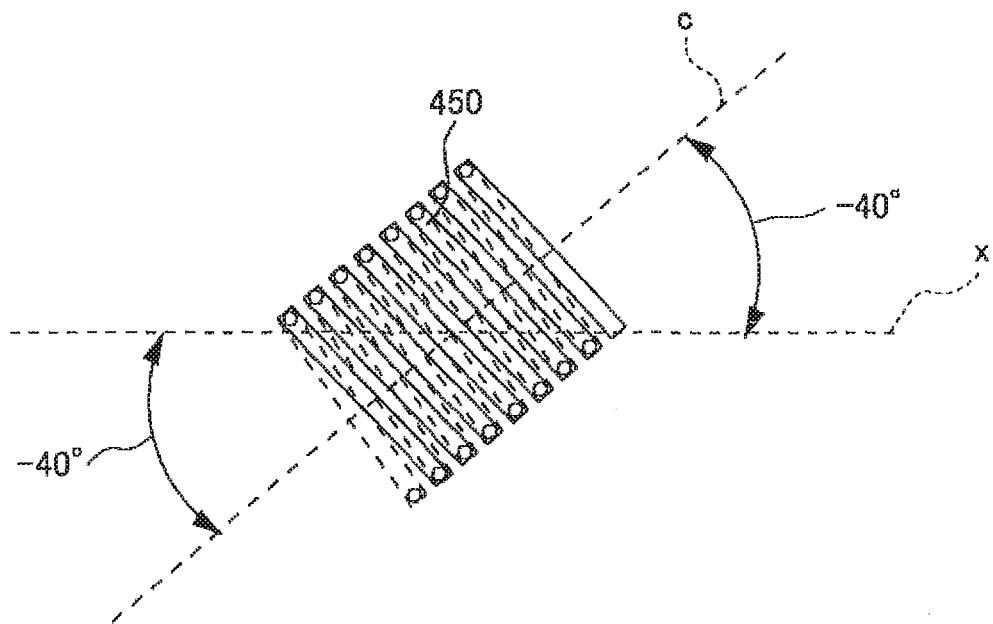
Figure 19:
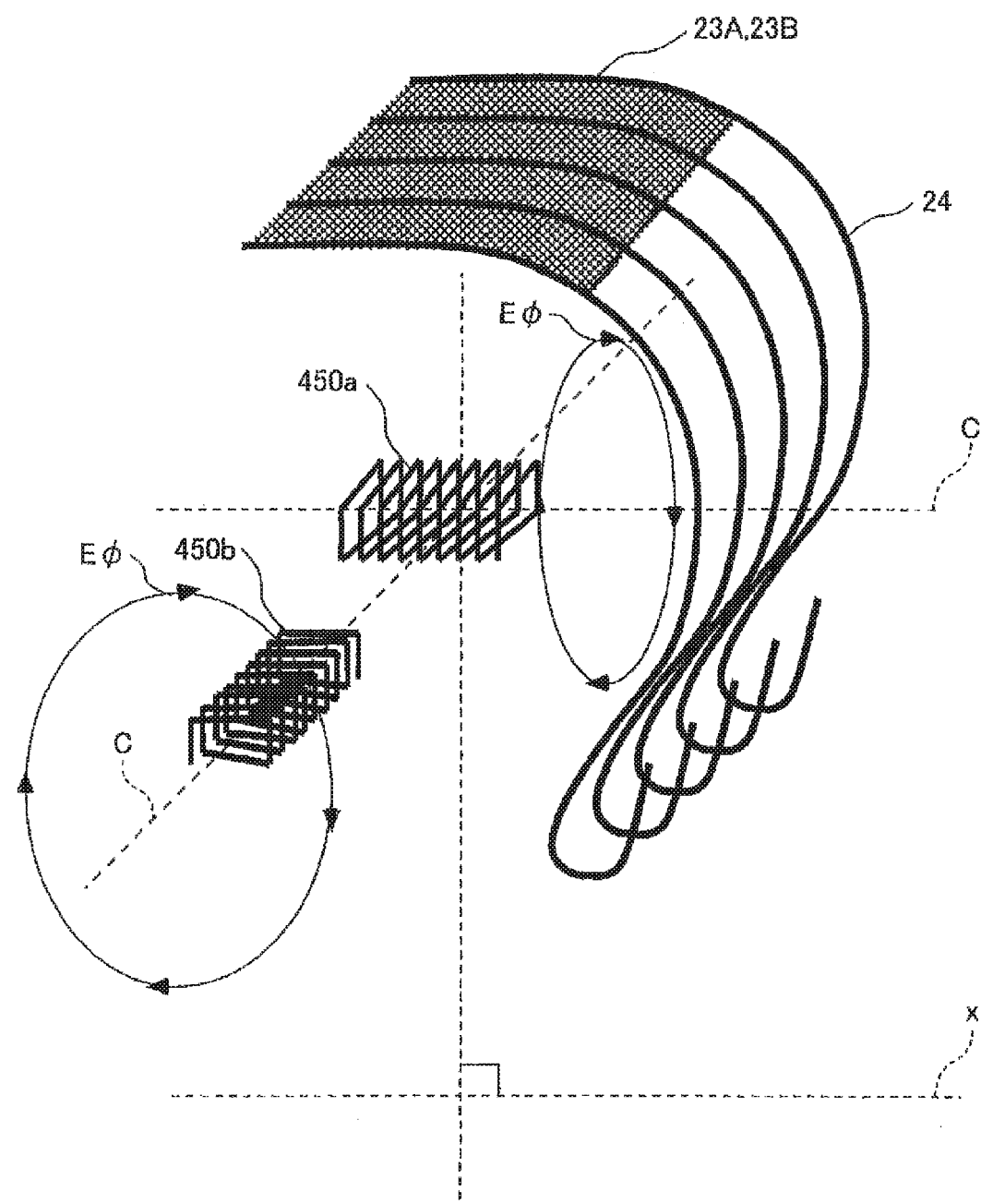
FIG. 19 is a view illustrating a relationship between a steel carcass and an emitted electrical field of a coil-shaped antenna in an embodiment of the present invention.

The description now relates to the arrangement of the information acquisition device 100, configured as described above, within the tire 2. FIG. 16 is a view of a three-dimensional illustration of the arrangement of the antenna 450 according to the present embodiment, and FIGS. 17 and 18 are plan views illustrating the arrangement of the antenna 450. FIG. 19 is a view of a three-dimensional illustration of the relationship between the steel carcass 24 inside the tire 2 and the emitted electrical field of the coil-shaped antenna 450.

FIGS. 17 and 18 illustrate the arrangement of the antenna 450 on a virtual plane PL when, as illustrated in FIG. 16, the virtual plane PL is defined as being a plane including the coil axis C of the antenna 450 and having a perpendicular line P orthogonal to the axis of rotation x of the tire 2. As illustrated in FIGS. 16 to 18, the information acquisition device 100 is disposed within the tire 2 such that the angle formed by the coil axis C relative to the tire rotational axis x is within a range 0°±40° in the virtual plane PL. Herein, as illustrated in FIG. 19, the emitted electrical field (Eφ) from the antenna 450 is generated circumferentially around the coil axis C.

FIG. 19 illustrates an antenna disposed such that the coil axis C is parallel with the tire rotational axis X as "450a", and illustrates an antenna disposed such that the coil axis is orthogonal thereto as "450b".

When the coil axis C is set to be 0° relative to (in parallel with) the axis of rotation x of the tire 2, as illustrated in FIGS. 17 and 19 (450a in FIG. 19), there is then present an electrical field (Eφ) orthogonal to the steel carcass 24. This orthogonal component is emitted to the outside of the tire 2 without being influenced by the presence of the steel carcass 24. By contrast, when the coil axis C is set to be 90° relative to the axis of rotation x of the tire 2 (450b in FIG. 19), the entire electrical field (Eφ) is in parallel with the steel carcass 24, and therefore the emission of the electrical field to the outside of the tire 2 is considerably reduced.

Figure 20:
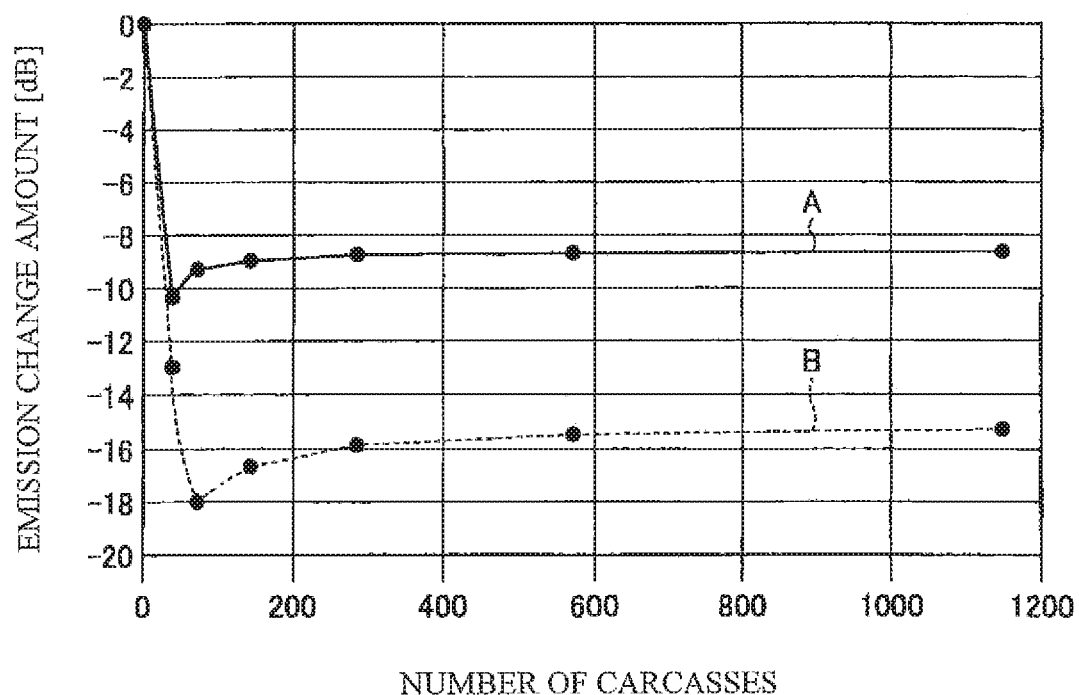
FIG. 20 is a view illustrating a characteristic curve representing an emission change amount in an embodiment of the present invention.

FIG. 20 illustrates the properties of an emission change amount that has been measured in actual practice. In FIG. 20, the vertical axis represents the emission change amount (dB), and the horizontal axis represents the number of steel carcasses 24 embedded in the tire side surface. When, for example, the information acquisition device 100 was disposed such that the coil axis C of the antenna 450 is in parallel with the tire rotational axis x, then the emission change amount as is illustrated by the curve A in FIG. 20 was measured. By contrast, when the information acquisition device 100 was disposed such that the coil axis C of the antenna 450 formed a 90° angle relative to the tire rotational axis x, the emission change amount as is illustrated by the curve B in FIG. 20 was measured. In this manner, when the information acquisition device 100 was disposed such that the coil axis C was in parallel with the tire rotational axis x, then the emission change amount was successfully improved by about 6 dB in comparison to when the information acquisition device was disposed such that the coil axis C formed a 90° angle relative to the tire rotational axis x.

As per the foregoing, the angle formed by the coil axis C relative to the tire rotational axis x is preferably closer to 0°. However, provided that the angle formed by the coil axis C relative to the tire rotational axis x is in the range ±40°, although the emission change amount decreases below the curve A, the amount of decrease therein can be kept below 2 dB. For this reason, in a case where the angle formed by the coil axis C relative to the tire rotational axis x is ±40°, as illustrated in FIG. 18, the emission change amount can still be considerably reduced in comparison to the curve B in FIG. 20.

In the tire 2 provided with the information acquisition device 100 according to the present embodiment as per the foregoing, the information acquisition device 100 is disposed within the tire 2 such that the angle formed by the coil axis C of the antenna 450 relative to the tire rotational axis x is within ±40°. In a tire 1 within which a steel carcass 24 has been embedded, as with a tire 2 for a large-sized vehicle, the steel carcass 24 embedded in the tire side surface is in general disposed so as to extend in the tire radial direction. More specifically, the steel carcass is disposed on a plane that includes the tire rotational axis x. For this reason, the tire side surface is less likely to interfere with a magnetic current forming a magnetic field in the coil-shaped antenna 450, which is a magnetic field antenna, in comparison to a tread part (the cap tread 21) where the steel belts 23A, 23B and the steel carcass 24 are embedded. As a result, the blocking by the steel carcass 24 of the radio waves emitted from the antenna 450 is decreased, and the attenuation of the transmission radio waves emitted to the exterior of the tire 2 can be reduced. This makes it possible to extend the distance of radio wave transmission/reception between the information acquisition device 100 and a device having a communication function on the tire exterior.

In the embodiment above, the information acquisition device 100 was configured such that both the air pressure and the temperature inside the tire 2 are detected, but the information acquisition device may also be configured such that either the air pressure or the temperature is detected. It would also be possible to configure the information acquisition device such that other physical quantities having a correlation with the air pressure or temperature inside the tire 2, i.e., other physical quantities for representing the status inside the tire 2 or of the tire 2, e.g., the temperature of the tire 2, the amount of distortion in the tire 2, the acceleration, and the like, are detected.

Figure 21:
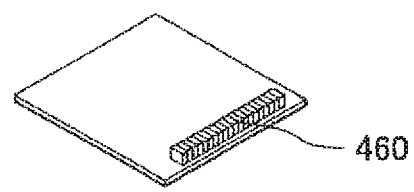
FIG. 21 is a view illustrating another example of a configuration for a coil-shaped antenna.
Figure 22:
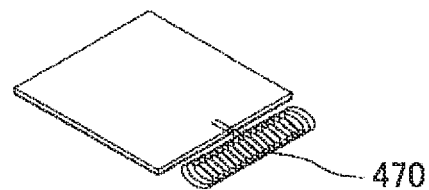
FIG. 22 is a view illustrating another example of a configuration for a coil-shaped antenna.

In the embodiment above, the antenna 450 of the information acquisition device 100 was formed using the printing patterns of the printed wiring boards, but the configuration of the antenna 450 is not limited thereto. For example, a similar effect could still be obtained by using a bar antenna 460 formed by winding an electroconductive wire onto a magnetic body, as illustrated in FIG. 21, or by using a coil antenna 470 where an electroconductive wire as is illustrated in FIG. 22 is simply wound in an air core coil. More specifically, the configuration of the antenna may be as desired, provided that the information acquisition device is provided such that the angle formed by the coil axis C relative to the tire rotational axis x is within the range of 0 to 40° within the virtual plane PL including the coil axis C of the antenna and having a perpendicular line orthogonal to the axis of rotation x of the tire 2.

Figure 23:
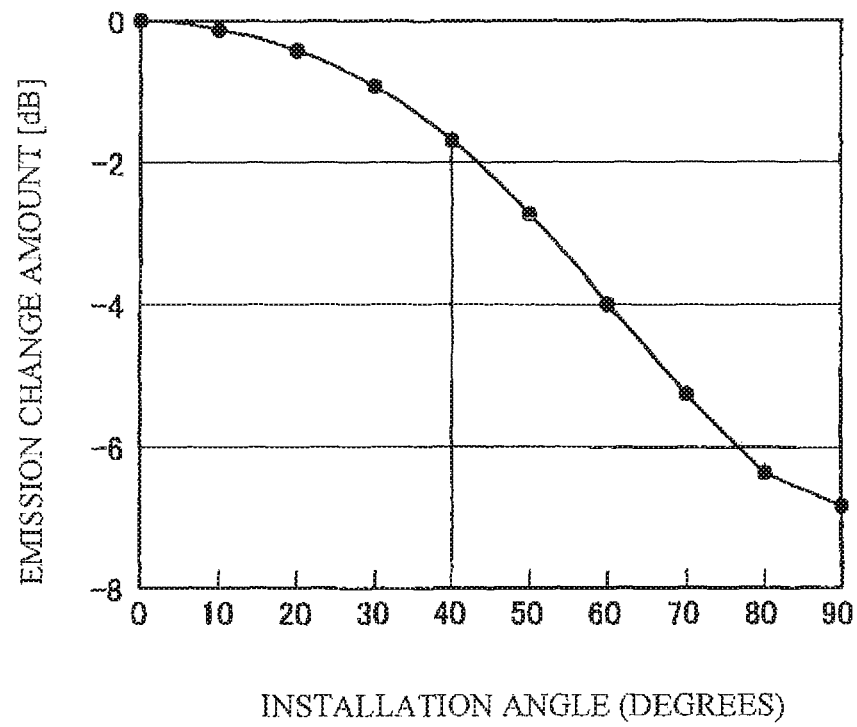
FIG. 23 is a view illustrating a characteristic curve representing an emission change amount in an embodiment of the present invention.

FIG. 23 illustrates the relationship between the angle at which the information acquisition device 100 is installed (the angle formed by the coil axis C relative to the tire rotational axis x) and the emission change amount (dB). As illustrated in FIG. 23, the emission change amount becomes progressively larger as the angle at which the information acquisition device 100 is installed becomes larger. The emission change amount, in practical usage, is preferably no greater than 2 dB, and this requirement is fulfilled whenever the angle of installation is within the range of 0 to 40°.

In the embodiment above, the information acquisition device 100 was mounted onto the rim 4, but the mounting position of the information acquisition device 100 is not limited thereto. The information acquisition device 100 may be mounted to a spot other than the rim 4, e.g., an inside surface of the tire 2 or elsewhere, in which case a similar effect to the description above can still be obtained.

It is thus possible to construct a tire provided in the interior space with a information acquisition device provided with a coil-shaped antenna and a transmission circuit, wherein the emission change amount of radio waves from the antenna to the exterior of the tire has been reduced, thus allowing for the distance of radio wave transmission/reception between the information acquisition device and a device on the exterior of the tire to be extended.

The invention claimed is:
1. A tire provided with an information acquisition device comprising:
   a sensor configured to detect predetermined physical information;
   a transmission circuit configured to transmit the physical information detected by the sensor;
   a coil-shaped antenna connected to the transmission circuit and configured to emit a signal including the physical information as a radio wave of a predetermined frequency, the antenna including:

a plurality of first printed wirings arranged on a first printed wiring board;

a plurality of second printed wirings arranged on a second printed wiring board; and a plurality of columnar connection conductors connecting the first printed wirings with the second printed wirings, and connecting the first printed wiring board with the second printed wiring board by separating the second printed wiring board from the first printed wiring board to create a space between the first and second printed wiring boards and positioning the second printed wiring board substantially in parallel with the first printed wiring board; and an electrical cell disposed in the space between the first and second printed wiring boards, the electrical cell being configured to supply electrical power to the transmission circuit;

the information acquisition device being provided to an interior space of the tire such that an angle formed by a coil axis of the antenna relative to an axis of rotation of the tire is within a range of 0 to 40°.

2. The tire as set forth in claim 1, wherein the information acquisition device is provided in a virtual plane including the coil axis of the antenna and having a perpendicular line orthogonal to the axis of rotation of the tire.

3. The tire as set forth in claim 2, wherein the information acquisition device is provided such that the coil axis of the antenna lies parallel to the tire rotational axis.

4. The tire as set forth in claim 3, wherein the tire is mounted on a rim, and the information acquisition device is mounted on the rim.

5. The tire as set forth in claim 3, wherein the tire has a steel carcass.

6. The tire as set forth in claim 2, wherein the tire is mounted on a rim, and the information acquisition device is mounted on the rim.

7. The tire as set forth in claim 6, wherein the tire has a steel carcass.

8. The tire as set forth in claim 2, wherein the tire has a steel carcass.

9. The tire as set forth in claim 1, wherein the information acquisition device is provided such that the coil axis of the antenna lies parallel to the tire rotational axis.

10. The tire as set forth in claim 9, wherein the tire is mounted on a rim, and the information acquisition device is mounted on the rim.

11. The tire as set forth in claim 9, wherein the tire has a steel carcass.

12. The tire as set forth in claim 1, wherein the tire is mounted on a rim, and the information acquisition device is mounted on the rim.

13. The tire as set forth in claim 12, wherein the tire has a steel carcass.

14. The tire as set forth in claim 1, wherein the tire has a steel carcass.

15. The tire as set forth in claim 14, wherein the steel carcass is embedded within the tire, in a side surface of the tire, so as to extend only in a radial direction about the axis of rotation of the tire.

16. The tire as set forth in claim 1, wherein the first and second printed wiring boards have an elongated structure, and the electric cell and the coil-shaped antenna are arranged in a longitudinal direction of the first and second printed wiring boards.

17. The tire as set forth in claim 16, wherein an axis direction of the coil-shaped antenna is perpendicular to the longitudinal direction of the first and second printed wiring boards.

18. The tire as set forth in claim 1, wherein a negative electrode of the electrical cell is electroconductively connected to a planar conductive plate of the tire.

19. The tire as set forth in claim 18, wherein the planar conductive plate is positioned outside of the coil-shaped antenna to be parallel to the first printed wiring board.

* * * * *